United States Patent
Wu et al.

(10) Patent No.: US 9,736,617 B2
(45) Date of Patent: Aug. 15, 2017

(54) APPARATUS, METHOD, AND SYSTEM FOR ACTIVATING A MOBILE TERMINAL

(71) Applicant: Samsung Electronics Co. Ltd., Suwon-si, Gyeonggi-do (KR)

(72) Inventors: Qian Wu, Overland Park, KS (US); Mohamad Ejaz Chauhan, Overland Park, KS (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/026,370

(22) Filed: Sep. 13, 2013

(65) Prior Publication Data

US 2015/0079982 A1    Mar. 19, 2015

(51) Int. Cl.
H04W 4/00 (2009.01)
H04L 12/24 (2006.01)

(52) U.S. Cl.
CPC ......... *H04W 4/001* (2013.01); *H04L 41/0273* (2013.01); *H04L 41/0806* (2013.01); *H04W 4/008* (2013.01)

(58) Field of Classification Search
CPC .................. H04W 4/001; H04W 4/008
USPC ........................ 455/456.1; 370/338
See application file for complete search history.

(56) References Cited

U.S. PATENT DOCUMENTS

| | | | |
|---|---|---|---|
| 7,861,933 B2 | 1/2011 | Zsigmond et al. | |
| 8,295,811 B1* | 10/2012 | Gailloux et al. | 455/411 |
| 2003/0162533 A1* | 8/2003 | Moles | H04M 3/42178 455/419 |
| 2005/0064901 A1* | 3/2005 | Park | H04M 1/2755 455/556.1 |
| 2006/0000910 A1 | 1/2006 | Chong et al. | |
| 2007/0027964 A1 | 2/2007 | Herrod et al. | |
| 2010/0045441 A1 | 2/2010 | Hirsch et al. | |
| 2010/0163613 A1 | 7/2010 | Bucher et al. | |
| 2011/0208545 A1* | 8/2011 | Kuester | 705/4 |
| 2011/0305338 A1* | 12/2011 | Rogan | H04W 12/02 380/270 |
| 2012/0042066 A1* | 2/2012 | Chatterjee et al. | 709/224 |
| 2012/0158922 A1* | 6/2012 | Aggarwal et al. | 709/220 |
| 2012/0250106 A1* | 10/2012 | Kiran Kannambadi et al. | 358/474 |
| 2013/0086650 A1 | 4/2013 | Soundrapandian et al. | |
| 2013/0157585 A1* | 6/2013 | Naruszewicz et al. | 455/73 |
| 2014/0274014 A1* | 9/2014 | Dodla | 455/418 |

FOREIGN PATENT DOCUMENTS

CN    103281755 A    9/2013

* cited by examiner

*Primary Examiner* — Marcos Batista
(74) *Attorney, Agent, or Firm* — Jefferson IP Law, LLP (57) ABSTRACT

An apparatus and method for activating a mobile terminal to communicate over a communication network are provided. The method includes retrieving, by a terminal, provisioning data associated with the communication network, transferring, by the terminal, the provisioning data to the mobile terminal, and configuring communication settings of the mobile terminal using the provisioning data.

22 Claims, 7 Drawing Sheets

APPARATUS, METHOD, AND SYSTEM FOR ACTIVATING A MOBILE TERMINAL

TECHNICAL FIELD

The present disclosure relates to an apparatus, method, and system for activating a mobile terminal. More particularly, the present disclosure relates to an apparatus, method, and system for instantly activating and configuring a mobile terminal.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

According to the related art, a mobile terminal offered for sale must be configured to communicate over the applicable network before the mobile terminal may be used to communicate over the intended communication networks. In other words, the mobile terminal must be activated. The mobile terminal is generally shipped in a state in which the mobile terminal is configured with the manufacturer's settings or the retailer's customized settings. Nevertheless, the mobile terminal must communicate with an applicable server to download the appropriate information for activating and configuring the mobile terminal to enable the mobile terminal to communicate over the intended communication network (e.g., without merely communicating over a WiFi or the like).

After the mobile terminal is purchased (e.g., when payment is complete), activation of the mobile terminal may take a few minutes. For example, the time required to activate the mobile terminal may be sensitive and variable according to network delays associated with transferring the requisite information for device activation. The process of activating a mobile terminal according to the related art may cause a user to be inconvenienced and thus dissatisfied with the manufacturer and/or retailer.

Accordingly, there is a need for improving the method for activating a new mobile terminal.

The information above is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for activating a mobile terminal to communicate over a communication network.

In accordance with an aspect of the present disclosure, a method for activating a mobile terminal to communicate over a communication network is provided. The method includes retrieving, by a terminal, provisioning data associated with the communication network, transferring, by the terminal, the provisioning data to the mobile terminal, and configuring communication settings of the mobile terminal using the provisioning data.

In accordance with another aspect of the present disclosure, a mobile terminal for using provisioning data to activate communication across a communication network is provided. The mobile terminal includes a communication unit configured to communicate with at least one of a terminal and a communication network, a control unit configured to use the provisioning data to configure the communication unit to communicate across the communication network, and wherein the provisioning data is transferred to the mobile terminal from the terminal.

In accordance with another aspect of the present disclosure, a system for activating a mobile terminal to communicate over a communication network is provided. The system includes a provisioning data server configured to store provisioning data associated with the communication network, and to communicate with a terminal, the terminal configured to retrieve the provisioning data from the provisioning data server, and to transfer the provisioning data to the mobile terminal, and the mobile terminal configured to receive the provisioning data from the terminal, and to configure communication settings of the mobile terminal using the provisioning data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As a non-exhaustive illustration only, a mobile terminal described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and the like capable of wireless communication or network communication consistent with that disclosed herein.

As a non-exhaustive illustration only, a terminal described herein may refer to mobile devices such as a cellular phone, a Personal Digital Assistant (PDA), a digital camera, a portable game console, an MP3 player, a Portable/Personal Multimedia Player (PMP), a handheld e-book, a tablet PC, a portable lap-top PC, a Global Positioning System (GPS) navigation, and devices such as a desktop PC, a high definition television (HDTV), a payment terminal, a Point of Sale (POS) terminal, and the like capable of wireless communication or network communication consistent with that disclosed herein.

Various embodiments of the present disclosure include an apparatus, a method, and a system for activating a mobile terminal.

Various embodiments of the present disclosure include an apparatus, a method, and a system for transferring provisioning data to a mobile terminal for activation thereof.

According to various embodiments of the present disclosure, a terminal retrieves provisioning data, the terminal transfers (e.g., transmits) the provisioning data to a mobile terminal, and the mobile terminal is configured and activated using the provisioning data.

According to various embodiments of the present disclosure, the terminal may retrieve the provisioning data from an applicable carrier's provisioning data server and/or provisioning database. For example, the terminal may communicate with a carrier's provisioning data server and/or provisioning database using web services or a client application provided and secured by the carrier.

According to various embodiments of the present disclosure, the provisioning data may include a device unique identifier (e.g., a device Mobile Equipment Identifier (MEID), an International Mobile Station Equipment Identity (IMEI), and/or the like), network configuration information such as, for example, Code Division Multiple Access (CDMA) information (e.g., Mobile Identification Number (MIN), Mobile Directory Number (MDN), Network Access Identifier (NAI), 3G Packet Data (3GPD) profile information, and/or the like), Long Term Evolution (LTE) Access Point Name (APN), subscriber information, target brand customization information (e.g., customization information for the applicable carrier, and/or the like), and/or the like. According to various embodiments of the present disclosure, the provisioning data may also include information that may be optional to the applicable carrier but which is not necessarily required as part of the activation process. For example, the provisioning data may include a Subscriber Identity module (SIM) lock service configuration information, a Band Class service configuration information, a 1x Advanced service configuration information, a Shared Port Adapter (SPA) service configuration information, configuration information for an LTE Extended service, Voice over WiFi, Qchat, Tr-brand nodes, and the like, or other extendable information.

According to various embodiments of the present disclosure, the provisioning data may include or may have security information associated therewith which provides security of the provisioning data and/or authentication of the mobile terminal which attempts to use the provisioning data. For example, the provisioning data and/or information associated therewith may include security information such as, for example, a device unique identifier, an expiration date of the provisioning data, an encryption (e.g., MD5 encryption), an encoding (e.g., B64 encoding), and/or the like. For example, the provisioning data may include the device unique identifier to ensure that only the correct (intended) device can apply the provisioning data.

According to various embodiments of the present disclosure, the terminal may transfer the provisioning data to the mobile terminal using a wireless communication. For example, the terminal may transfer the provisioning data to the mobile terminal using Near Field Communications (NFC), Bluetooth, WiFi, and/or the like.

According to various embodiments of the present disclosure, the terminal may transfer the provisioning data to the mobile terminal using an image, a barcode, and/or the like. For example, the terminal may generate an image, a barcode, or the like, in which the provisioning data is embedded. According to various embodiments of the present disclosure, the terminal may print or otherwise reproduce the image, the bar code, and/or the like for the mobile terminal to scan. For example, the terminal may display the image, the barcode, and/or the like on a display unit operatively connected thereto.

According to various embodiments of the present disclosure, the provisioning data transferred to the mobile terminal may relate to a communication network at a destination to which the user of the mobile terminal is travelling. Accordingly, upon arriving at the destination, the mobile terminal may automatically (e.g., immediately) communicate with the communication network at the destination. For example, if the user of the mobile terminal is traveling to a foreign country, then the provisioning data for a communication network covering the foreign country may be provided to the mobile terminal. The provisioning data may be embedded or otherwise included in an image and/or a barcode printed on a plane ticket, a travel reservation, or the like. For example, the provisioning data may include a Preferred Roaming List (PRL) for the corresponding foreign country.

According to various embodiments of the present disclosure, the provisioning data may include information for configuring the mobile terminal after initial activation of the mobile terminal. For example, the provisioning data may include information that may be used to configure a mobile terminal for a firmware upgrade, a software upgrade, and/or the like. As an example, the provisioning data may include information necessary for the mobile terminal to upgrade the firmware, software, and/or the like thereof.

Figure 1:
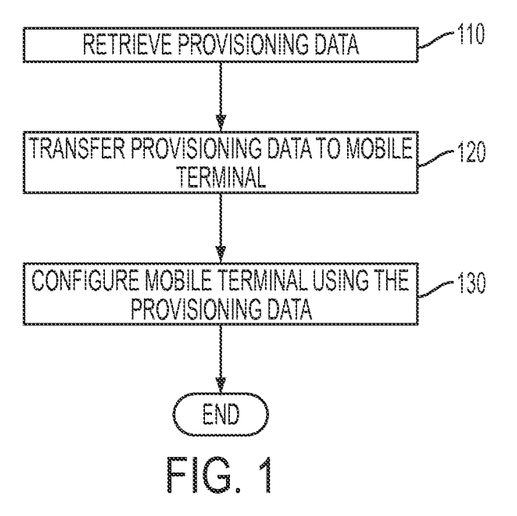
FIG. 1 is a flowchart illustrating a method of activating a mobile terminal according to an embodiment of the present disclosure.

FIG. 1 is a flowchart illustrating a method of activating a mobile terminal according to an embodiment of the present disclosure.

Referring to FIG. 1, at operation 110, a terminal retrieves provisioning data with which a mobile terminal may be configured (e.g., activated). For example, upon completion of payment for the mobile terminal, a terminal may communicate with a communication network to retrieve provisioning data. The terminal may access a carrier's provisioning data server and/or provisioning database to retrieve applicable provisioning data. The terminal may access the carrier's provisioning database using web services or a client application provided and secured by the carrier.

Thereafter, at operation 120, the terminal transfers the provisioning data to the mobile terminal. For example, the terminal may be operatively connected to the mobile terminal to facilitate transfer of the provisioning data to the mobile terminal. The terminal may transfer the provisioning data to the mobile terminal over a wired and/or wireless connection. As an example, the terminal may transfer the provisioning data to the mobile terminal using a NFC, Bluetooth, and/or the like.

According to various embodiments of the present disclosure, the terminal may authenticate the mobile terminal before transferring the provisioning data thereto. For example, the terminal may determine whether the mobile terminal is the intended and/or authorized recipient of the provisioning data.

At operation 130, the mobile terminal is configured (e.g., activated) using the provisioning data. For example, the mobile terminal may configure configuration settings thereof to communicate over a communication network with which the provisioning data is associated.

According to various embodiments of the present disclosure, the mobile terminal may include an Open Mobile Alliance (OMA) Device Management (DM) client. The OMADM client may process (e.g., decode, decrypt, and/or the like) the provisioning data.

According to various embodiments of the present disclosure, security information may be embedded or otherwise associated with the provisioning data. As an example, the mobile terminal may extract or otherwise use the security information and determine whether the provisioning data is intended for the mobile terminal. As another example, the mobile terminal may use the security information to determine whether the provisioning data has expired (e.g., the security information may include a date and/or a time relating to validity of the provisioning data). If the mobile terminal determines that the provisioning data is valid and/or is applicable to the mobile terminal, then the mobile terminal may use the provisioning data to configure (e.g., activate), for example, the mobile terminal communication settings according to the applicable communication network.

Figure 2:
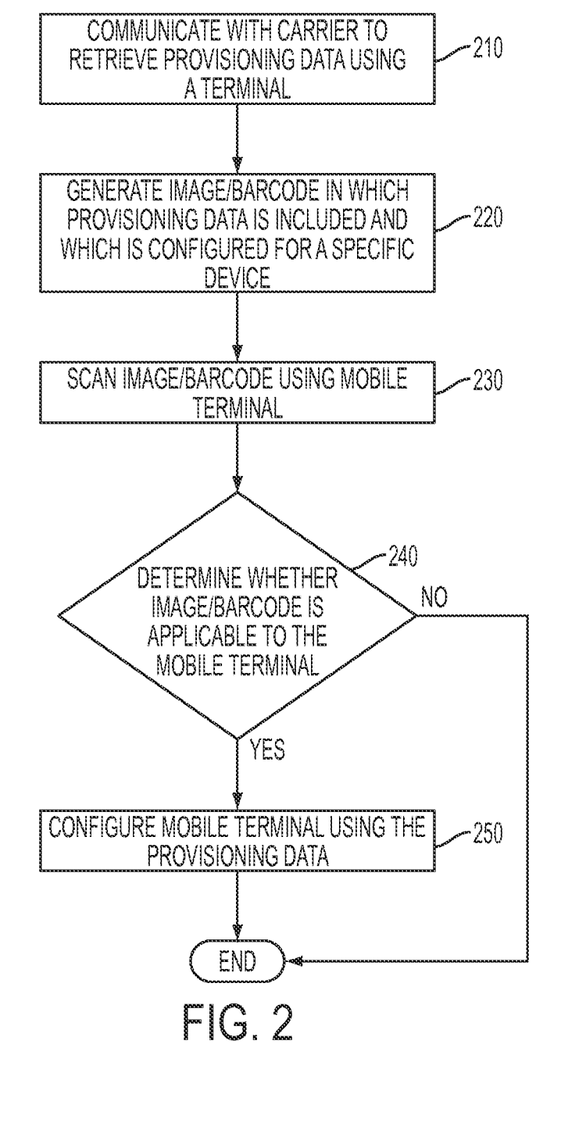
FIG. 2 is a flowchart illustrating a method of activating a mobile terminal according to an embodiment of the present disclosure.

FIG. 2 is a flowchart illustrating a method of activating a mobile terminal according to an embodiment of the present disclosure.

Referring to FIG. 2, at operation 210, a terminal communicates with a carrier network to retrieve provisioning data. For example, upon completion of payment for a mobile terminal, a terminal may communicate with a communication network to retrieve provisioning data. The terminal may access a carrier's provisioning data server and/or provisioning database to retrieve applicable provisioning data. The terminal may access the carrier's provisioning database using web services or a client application provided and secured by the carrier.

Thereafter, at operation 220, the terminal generates an image and/or a barcode in which the provisioning data (e.g., the provisioning data retrieved from the carrier network) is included and which is configured for the mobile terminal.

According to various embodiments of the present disclosure, the image and/or the barcode generated by the terminal correspond to a picture, a barcode, a matrix barcode (e.g., a two-dimensional barcode, a Quick Response (QR) code, or the like), or the like. The terminal may embed or otherwise include the provisioning data in the image and/or the bar code. In addition, the terminal may embed or otherwise include security information. The security information may be included as part of the provisioning data, or may be separately included in the image and/or the barcode.

According to various embodiments of the present disclosure, the security information may indicate the specific device for which the provisioning data is intended. According to various embodiments of the present disclosure, the security information may be used to authenticate the device (e.g., the mobile terminal) attempting to use the provisioning data to configure the device to communicate with the communication network to which the provisioning data relates.

According to various embodiments of the present disclosure, after the terminal generates the image and/or the barcode, the terminal may print or otherwise reproduce the image and/or the barcode. For example, according to various embodiments of the present disclosure, the terminal may print the image and/or the barcode on a piece of paper or other tangible recording medium (e.g., to enable the mobile terminal user/owner to activate the mobile terminal according to the user's convenience). As another example, the terminal may reproduce the image and/or the barcode on a display unit operatively connected to the terminal.

At operation 230, the mobile terminal scans the image and/or the barcode. For example, the mobile terminal may extract the provisioning data and/or the security information embedded or otherwise included in the image and/or the barcode. The mobile terminal may scan the image and/or the barcode using a camera unit (or other image capturing unit) operatively connected to or integrated with the mobile terminal (e.g., to enable the mobile terminal user/owner to activate the mobile terminal at the point of sale, or another convenient location).

For example, according to various embodiments of the present disclosure, the mobile terminal may scan the image and/or the barcode from a piece of paper or tangible recording medium on which the image and/or the barcode is printed. As another example, according to various embodiments of the present disclosure, the mobile terminal may scan the image and/or the barcode from a display unit on which the terminal displays the image and/or barcode.

At operation 240, the mobile terminal determines whether the image and/or the barcode is applicable to the mobile terminal. For example, the mobile terminal determines whether the provisioning data embedded or otherwise included in the image and/or the barcode is intended for the mobile terminal.

According to various embodiments of the present disclosure, the mobile terminal may determine whether the provisioning data transferred thereto is applicable to the mobile terminal. For example, the mobile terminal determines whether the provisioning data received from the terminal is intended for the mobile terminal According to various embodiments of the present disclosure, the mobile terminal may examine the provisioning data and/or the security information associated therewith. For example, the mobile terminal may determine whether the provisioning data and/or the security information includes an identifier or the like which identifies the device for which the provisioning data is intended (e.g., the device authorized to activate or otherwise configure to use the communication network using the provisioning data). The mobile terminal may further determine whether any identifier or the like which identifies the device for which the provisioning data is intended corresponds to the identifier or the like of the mobile terminal.

If the mobile terminal determines that the image and/or the barcode is not applicable to the mobile terminal at operation 240, then the mobile terminal may end the configuration (e.g., activation) process.

In contrast, if the mobile terminal determines that the image and/or the barcode is applicable to the mobile terminal at operation 240, then the mobile terminal may proceed to operation 250 at which the mobile terminal configures the mobile terminal (e.g., the communication settings thereof) using the provisioning data.

For example, according to various embodiments of the present disclosure, the mobile terminal may complete the activation process using the provisioning data to enable the mobile terminal to communicate over the communication network to which the provisioning data relates. As an example, the mobile terminal may use network configuration information such as, for example, CDMA information (e.g., MIN, MDN, NAI, 3GPD profile information, and/or the like), LTE APN, subscriber information, target brand customization information (e.g., customization information for the applicable carrier, and/or the like), and/or the like to configure the mobile terminal to communicate over the communication network to which the provisioning data relates. According to various embodiments of the present disclosure, the provisioning data may also include information that may be optional to the applicable carrier but which is not necessarily required as part of the activation process. For example, the provisioning data may include a Subscriber Identity module (SIM) lock service configuration information, a Band Class service configuration information, a 1× Advanced service configuration information, a Shared Port Adapter (SPA) service configuration information, configuration information for an LTE Extended service, Voice over WiFi, Qchat, Tr-brand nodes, and the like, or other extendable information.

Figure 3:
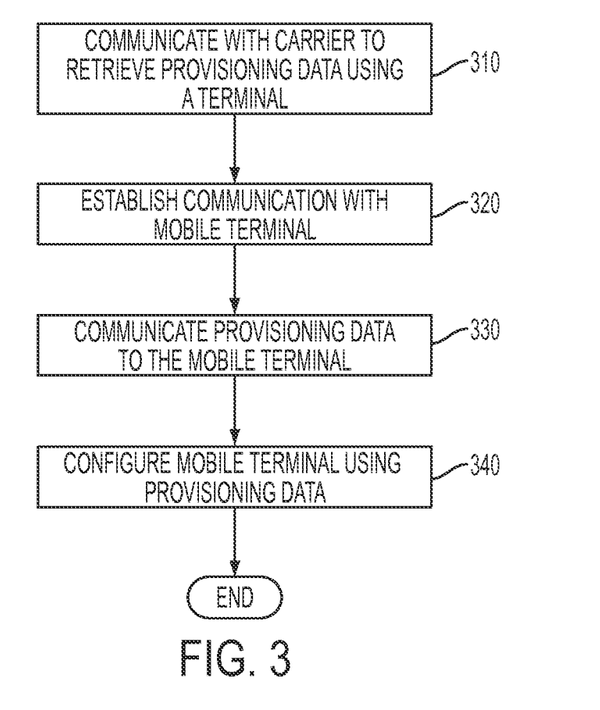
FIG. 3 is a flowchart illustrating a method of activating a mobile terminal according to an embodiment of the present disclosure.

FIG. 3 is a flowchart illustrating a method of activating a mobile terminal according to an embodiment of the present disclosure.

Referring to FIG. 3, at operation 310, a terminal communicates with a carrier network to retrieve provisioning data. For example, upon completion of payment for a mobile terminal, a terminal may communicate with a communication network to retrieve provisioning data. The terminal may access a carrier's provisioning data server and/or provisioning database to retrieve applicable provisioning data. The terminal may access the carrier's provisioning database using web services or a client application provided and secured by the carrier.

Thereafter, at operation 320, a connection between the terminal and the mobile terminal may be established. For example, the terminal and the mobile terminal may be connected through a wired connection such as, for example, a Universal Serial Bus (USB) connection, a micro USB connection, a FireWire connection, a connection over a Local Area Network (LAN), and/or the like. As another example, the terminal and the mobile terminal may be connected over a wireless connection such as, for example, NFC, Bluetooth, WiFi, Infrared communications, and/or the like.

According to various embodiments of the present disclosure, the terminal may authenticate the mobile terminal before transferring the provisioning data to the mobile terminal. For example, the terminal may determine whether the mobile terminal corresponds to the device for which the provisioning data is intended before transferring the provisioning data. Upon confirming (e.g., authenticating) that the mobile terminal corresponds to the device for which the provisioning data is intended, the terminal may transfer the provisioning data and/or security information to the mobile terminal.

At operation 330, the terminal communicates the provisioning data and/or security information to the mobile terminal.

For example, according to various embodiments of the present disclosure, upon confirming (e.g., authenticating) that the mobile terminal corresponds to the device for which the provisioning data is intended, the terminal may transfer the provisioning data and/or security information to the mobile terminal.

At operation 340, the mobile terminal configures the mobile terminal (e.g., the communication settings thereof) using the provisioning data.

For example, according to various embodiments of the present disclosure, the mobile terminal may complete the activation process using the provisioning data to enable the mobile terminal to communicate over the communication network to which the provisioning data relates. As an example, the mobile terminal may use network configuration information such as, for example, CDMA information (e.g., MIN, MDN, NAI, 3GPD profile information, and/or the like), LTE APN, subscriber information, target brand customization information (e.g., customization information for the applicable carrier, and/or the like), and/or the like to configure the mobile terminal to communicate over the communication network to which the provisioning data relates. According to various embodiments of the present disclosure, the provisioning data may also include information that may be optional to the applicable carrier but which is not necessarily required as part of the activation process. For example, the provisioning data may include a Subscriber Identity module (SIM) lock service configuration information, a Band Class service configuration information, a 1× Advanced service configuration information, a Shared Port Adapter (SPA) service configuration information, configuration information for an LTE Extended service, Voice over WiFi, Qchat, Tr-brand nodes, and the like, or other extendable information.

According to various embodiments of the present disclosure, the mobile terminal may determine whether the provisioning data transferred thereto is applicable to the mobile terminal. For example, the mobile terminal determines whether the provisioning data received from the terminal is intended for the mobile terminal According to various embodiments of the present disclosure, the mobile terminal may examine the provisioning data and/or the security information associated therewith. For example, the mobile terminal may determine whether the provisioning data and/or the security information includes an identifier or the like which identifies the device for which the provisioning data is intended (e.g., the device authorized to activate or otherwise configure to use the communication network using the provisioning data). The mobile terminal may further determine whether any identifier or the like which is included in the provisioning data and/or security information and which identifies the device for which the provisioning data is intended corresponds to the identifier or the like of the mobile terminal.

Figure 4:
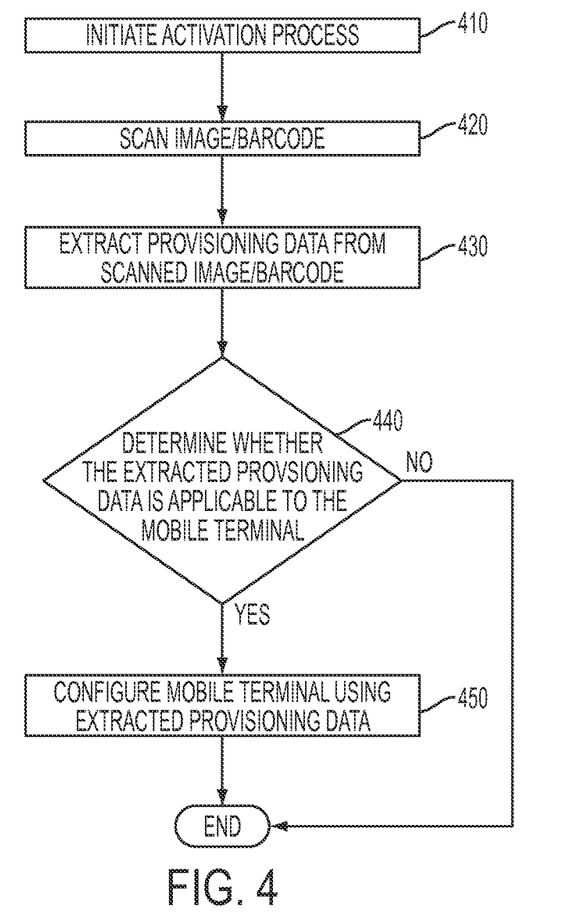
FIG. 4 is a flowchart illustrating a method by a mobile terminal for activating the mobile terminal according to an embodiment of the present disclosure.

FIG. 4 is a flowchart illustrating a method by a mobile terminal for activating the mobile terminal according to an embodiment of the present disclosure.

Referring to FIG. 4, at operation 410, the mobile terminal initiates an activation process. For example, the mobile terminal may receive user input requesting to activate the mobile terminal with a communication network.

At operation 420, the mobile terminal scans an image and/or a barcode. The mobile terminal may scan the image and/or the barcode using a camera unit (or other image capturing unit) operatively connected to or integrated with the mobile terminal (e.g., to enable the mobile terminal user/owner to activate the mobile terminal at the point of sale or another convenient location).

For example, according to various embodiments of the present disclosure, the mobile terminal may scan the image and/or the barcode from a piece of paper or tangible recording medium on which the image and/or the barcode is printed. As another example, according to various embodiments of the present disclosure, the mobile terminal may scan the image and/or the barcode from a display unit on which the terminal displays the image and/or barcode.

At operation 430, the mobile terminal may extract the provisioning data and/or the security information embedded or otherwise included in the image and/or the barcode.

At operation 440, the mobile terminal determines whether the image and/or the barcode is applicable to the mobile terminal. For example, the mobile terminal determines whether the provisioning data embedded or otherwise included in the image and/or the barcode is intended for the mobile terminal.

According to various embodiments of the present disclosure, the mobile terminal may determine whether the provisioning data transferred thereto is applicable to the mobile terminal. For example, the mobile terminal determines whether the provisioning data received from the terminal is intended for the mobile terminal According to various embodiments of the present disclosure, the mobile terminal may examine the provisioning data and/or the security information associated therewith. For example, the mobile terminal may determine whether the provisioning data and/or the security information includes an identifier or the like which identifies the device for which the provisioning data is intended (e.g., the device authorized to activate or otherwise configure to use the communication network using the provisioning data). The mobile terminal may further determine whether any identifier or the like which identifies the device for which the provisioning data is intended corresponds to the identifier or the like of the mobile terminal.

If the mobile terminal determines that the image and/or the barcode is not applicable to the mobile terminal at operation 440, then the mobile terminal may end the configuration (e.g., activation) process.

In contrast, if the mobile terminal determines that the image and/or the barcode is applicable to the mobile terminal at operation 440, then the mobile terminal may proceed to operation 450 at which the mobile terminal configures the mobile terminal (e.g., the communication settings thereof) using the provisioning data.

Figure 5:
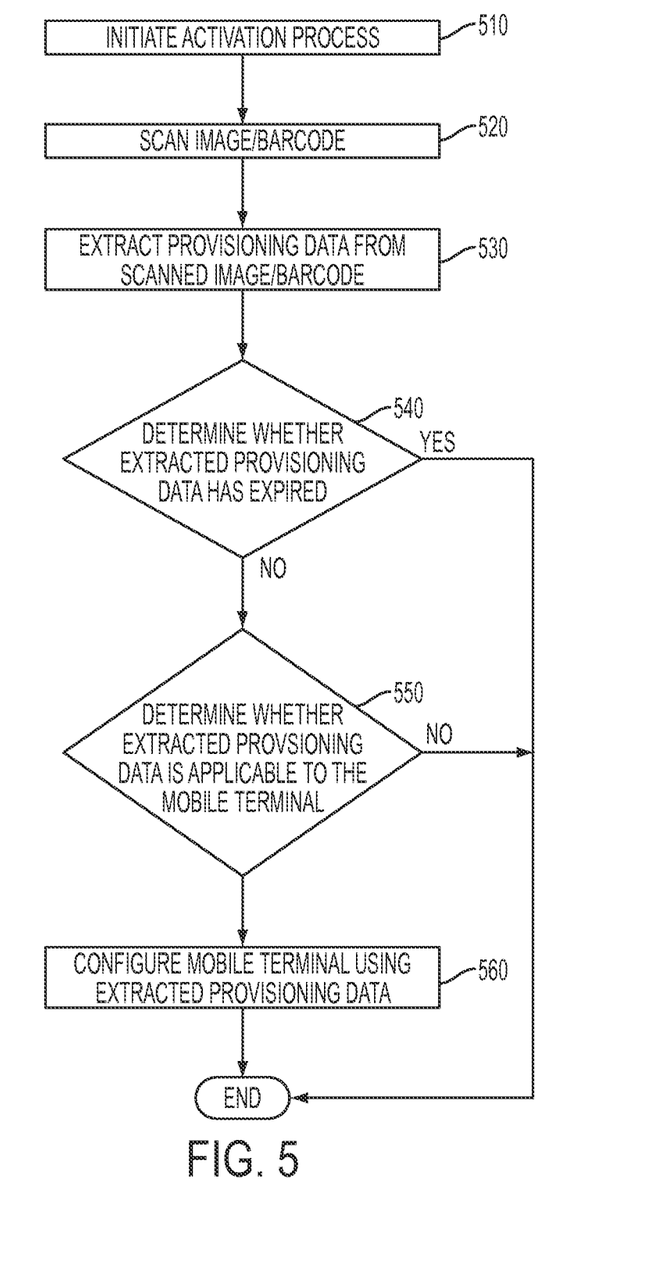
FIG. 5 is a flowchart illustrating a method by a mobile terminal for activating the mobile terminal according to an embodiment of the present disclosure.

FIG. 5 is a flowchart illustrating a method by a mobile terminal for activating the mobile terminal according to an embodiment of the present disclosure.

Referring to FIG. 5, at operation 510, the mobile terminal initiates an activation process. For example, the mobile terminal may receive user input requesting to activate the mobile terminal with a communication network.

At operation 520, the mobile terminal scans an image and/or a barcode. The mobile terminal may scan the image and/or the barcode using a camera unit (or other image capturing unit) operatively connected to or integrated with the mobile terminal (e.g., to enable the mobile terminal user/owner to activate the mobile terminal at the point of sale or another convenient location).

For example, according to various embodiments of the present disclosure, the mobile terminal may scan the image and/or the barcode from a piece of paper or tangible recording medium on which the image and/or the barcode is printed. As another example, according to various embodiments of the present disclosure, the mobile terminal may scan the image and/or the barcode from a display unit on which the terminal displays the image and/or barcode.

At operation 530, the mobile terminal may extract the provisioning data and/or the security information embedded or otherwise included in the image and/or the barcode.

At operation 540, the mobile terminal determines whether the extracted provisioning data has expired. For example, according to various embodiments of the present disclosure, the provisioning data may include an expiration date of the provisioning date. As another example, the mobile terminal may use the security information to determine whether the provisioning data has expired (e.g., the security information may include a date and/or a time relating to validity of the provisioning data).

If the mobile terminal determines that the extracted provisioning data has expired at operation 540, then the mobile terminal may end the configuration (e.g., activation) process.

In contrast, if the mobile terminal determines that the extracted provisioning data has not expired at operation 540, then the mobile terminal proceeds to operation 550 at which the mobile terminal determines whether the image and/or the barcode is applicable to the mobile terminal. For example, the mobile terminal determines whether the provisioning data embedded or otherwise included in the image and/or the barcode is intended for the mobile terminal.

According to various embodiments of the present disclosure, the mobile terminal may determine whether the provisioning data transferred thereto is applicable to the mobile terminal. For example, the mobile terminal determines whether the provisioning data received from the terminal is intended for the mobile terminal According to various embodiments of the present disclosure, the mobile terminal may examine the provisioning data and/or the security information associated therewith. For example, the mobile terminal may determine whether the provisioning data and/or the security information includes an identifier or the like which is included in the provisioning data and/or security information and which identifies the device for which the provisioning data is intended (e.g., the device authorized to activate or otherwise configure to use the communication network using the provisioning data). The mobile terminal may further determine whether any identifier or the like which identifies the device for which the provisioning data is intended corresponds to the identifier or the like of the mobile terminal.

If the mobile terminal determines that the image and/or the barcode is not applicable to the mobile terminal at operation 550, then the mobile terminal may end the configuration (e.g., activation) process.

In contrast, if the mobile terminal determines that the image and/or the barcode is applicable to the mobile terminal at operation 550, then the mobile terminal may proceed to operation 560 at which the mobile terminal configures the mobile terminal (e.g., the communication settings thereof) using the provisioning data.

According to various embodiments of the present disclosure, operation 550 may be performed before operation 540.

Figure 6:
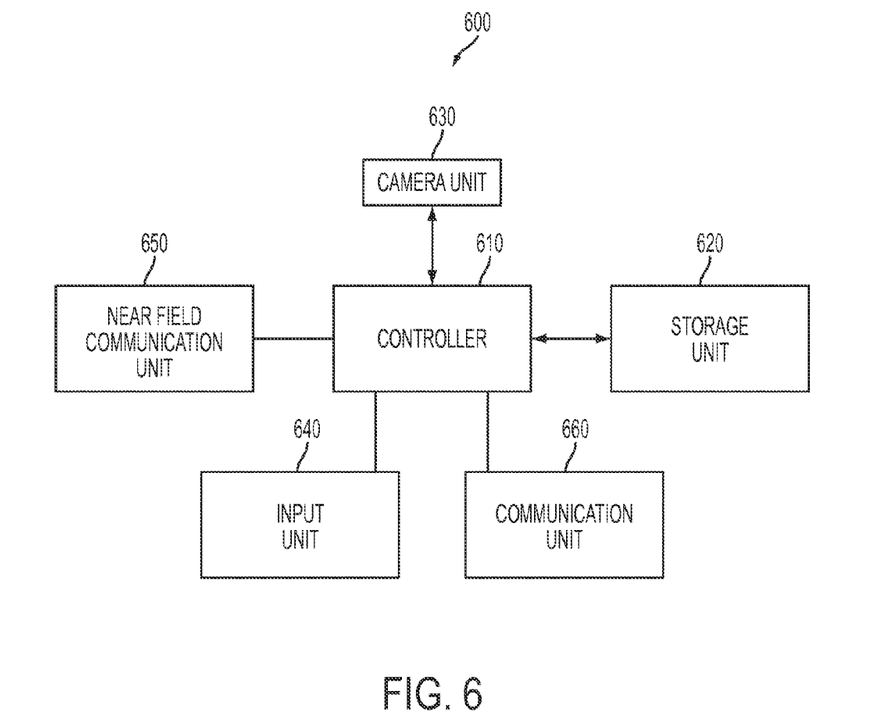
FIG. 6 is a block diagram schematically illustrating a configuration of a mobile terminal according to an embodiment of the present disclosure.

FIG. 6 is a block diagram schematically illustrating a configuration of a mobile terminal according to an embodiment of the present disclosure.

Referring to FIG. 6, the mobile terminal 600 includes a control unit 610, a storage unit 620, and a communication unit 660. According to various embodiments of the present disclosure, the mobile terminal 600 may also include a camera unit 630, and input unit 640, a NFC unit 650, and/or the like.

According to various embodiments of the present disclosure, the mobile terminal 600 may be configured to configure (e.g., activate) the mobile terminal 600 (e.g., the communication settings thereof) using provisioning data. According to various embodiments of the present disclosure, the mobile terminal 600 may be configured to receive the provisioning data from a terminal. For example, the mobile terminal 600 may be configured to receive the provisioning data without directly communicating with the intended carrier network (e.g., to directly download the provisioning data from the carrier's provisioning data server, provisioning database, or the like).

According to various embodiments of the present disclosure, the mobile terminal 600 may be configured to communicate with a terminal to receive the provisioning data. For example, the mobile terminal 600 may be configured to communicate with the terminal through a wired connection such as, for example, a USB connection, a micro USB connection, a FireWire connection, a connection over a LAN, and/or the like. As another example, the mobile terminal 600 may be configured to communicate with the terminal over a wireless connection such as, for example, NFC, Bluetooth, WiFi, Infrared communications, and/or the like.

According to various embodiments of the present disclosure, the mobile terminal 600 may be configured to receive the provisioning data by scanning an image and/or barcode. For example, the mobile terminal 600 may extract the provisioning data and/or the security information embedded or otherwise included in the image and/or the barcode. The mobile terminal 600 may scan the image and/or the barcode using a camera unit 630 (or other image capturing unit) operatively connected to or integrated with the mobile terminal 600 (e.g., to enable the mobile terminal 600 user/owner to activate the mobile terminal 600 at the point of sale, or another convenient location).

The storage unit 620 can store user data, and the like, as well a program which performs operating functions according to various embodiments of the present disclosure. For example, the storage unit 620 may store a program for controlling general operation of a mobile terminal 600, an Operating System (OS) which boots the mobile terminal 600, and application program for performing other optional functions such as a camera function, a sound replay function, an image or video replay function, a Near Field Communication (NFC) function, and/or the like. Further, the storage unit 620 may store user data generated according to a user of the mobile terminal 600, such as, for example, a text message, a game file, a music file, a movie file, and/or the like. In particular, according to various embodiments of the present disclosure, the storage unit 620 may store an application that enables a user to configure (e.g., activate) the mobile terminal 600 to communicate over a desired communication network (e.g., a carrier's communication network). According to various embodiments of the present disclosure, the storage unit 620 may store an application which receives the provisioning data for configuring the communication settings of the mobile terminal 600. For example, the storage unit 620 may store an application which receives the provisioning data without directly communicating with the intended carrier network (e.g., to directly download the provisioning data from the carrier's provisioning data server, provisioning database, or the like).

According to various embodiments of the present disclosure, the storage unit 620 may store an application which communicates with a terminal to receive the provisioning data. For example, the storage unit 620 may store an application which enables the mobile terminal to communicate with the terminal through a wired connection such as, for example, a USB connection, a micro USB connection, a FireWire connection, a connection over a LAN, and/or the like. As another example, the storage unit 620 may store an application which enables the mobile terminal 600 to communicate with the terminal over a wireless connection such as, for example, NFC, Bluetooth, WiFi, Infrared communications, and/or the like. As another example, the storage unit 620 may store an application which enables the mobile terminal 600 to receive the provisioning data by scanning an image and/or barcode. For example, the storage unit 620 may store an application which enables the mobile terminal 600 to extract the provisioning data and/or the security information embedded or otherwise included in the image and/or the barcode. According to various embodiments of the present disclosure, the storage unit 620 may store an application which enables the mobile terminal 600 to scan the image and/or the barcode using a camera unit 630 (or other image capturing unit) operatively connected to or integrated with the mobile terminal 600 (e.g., to enable the mobile terminal 600 user/owner to activate the mobile terminal 600 at the point of sale, or another convenient location).

The NFC unit 650 may be configured for communicating with another device (e.g., the terminal) via NFC. According to various embodiments of the present disclosure, the NFC unit 650 may be configured to pair (e.g., automatically) with another device. For example, the NFC unit 650 may pair the mobile terminal 600 with the terminal when the mobile terminal 600 is brought into close proximity with the terminal. As another example, the NFC unit 650 may communicate with the terminal when the mobile terminal 600 is brought into close proximity with the terminal. According to various embodiments of the present disclosure, the NFC unit 650 may communicate with the terminal when a user provides an input requesting that the mobile terminal 600 acquire (e.g., receive from the terminal) the provisioning data. According to various embodiments of the present disclosure, the NFC unit 650 may transfer or receive some data such as, for example, metadata to the terminal before the terminal confirms the transfer of the data. The NFC unit 650 may receive the provisioning data and/or security information from the terminal.

The communication unit 660 may be configured for communicating with other devices, a communication network, and/or the like. For example, the communication unit 660 may be configured to communicate via Bluetooth technology, WiFi technology, and/or another wireless technology (e.g., CMDA, LTE, and/or the like). According to various embodiments of the present disclosure, the communication unit 660 may be configured to receive provisioning data and/or security information from the terminal using a through a wired connection such as, for example, a USB connection, a micro USB connection, a FireWire connection, a connection over a LAN, and/or the like. According to various embodiments of the present disclosure, the communication unit 660 may be configured to communicate with the terminal over a wireless connection such as, for example, Bluetooth, WiFi, Infrared communications, and/or the like.

According to various embodiments of the present disclosure, the mobile terminal 600 may use the provisioning data to configure communication settings of the communication unit 660 to enable the mobile terminal 600 to communicate with a desired communication network (e.g., a carrier's communication network).

The input unit 640 may include input keys and function keys for receiving user input. For example, the input unit 640 may include input keys and function keys for receiving an input of numbers or various sets of letter information, setting various functions, and controlling functions of the mobile terminal 600. For example, the input unit 640 may include a calling key for requesting a voice call, a video call request key for requesting a video call, a termination key for requesting termination of a voice call or a video call, a volume key for adjusting output volume of an audio signal, a direction key, and the like. In particular, according to various embodiments of the present disclosure, the input unit 640 may transmit to the control unit 610 signals related to requesting imitation of an activation of the mobile terminal 600, a selection of devices to which the mobile terminal 600 is connected (e.g., to enable the mobile terminal 600 to connect with the terminal), inputs related to scanning an image and/or a barcode (e.g., requesting the camera unit 630 to capture an image), and/or the like. Such an input unit 640 may be formed by one or a combination of input means such as a touch pad, a touchscreen, a button-type key pad, a joystick, a wheel key, and/or the like.

The camera unit 630 may be configured to perform image capture. For example, the camera unit 630 may capture an image and/or a video. The camera unit may be configured to capture an image and/or a barcode in which provisioning and/or security information is embedded.

According to various embodiments of the present disclosure, the mobile terminal 600 comprises at least one control unit 610. The control unit 610 may be configured to operatively control the mobile terminal 600. For example, the control unit 610 may control operation of the various components or units included in the mobile terminal 600. The control unit 610 may transmit a signal to the various components included in the mobile terminal 600 and control a signal flow between internal blocks of the mobile terminal 600. In particular, according to various embodiments of the present disclosure, the control unit 610 can control configuration of the communication settings (e.g., of the communication unit 660) using provisioning data to allow the mobile terminal 600 to communicate over a desired communication network (e.g., a carrier's communication network to which the provisioning data relates). According to various embodiments of the present disclosure, the control unit 610 can control the mobile terminal 600 to receive the provisioning data and/or security information. For example, the control unit 610 may be configured to control the mobile terminal 600 so as to communicate with a terminal to receive the provisioning data and/or security information over a wired connection (e.g., USB, and/or the like) and/or a wireless connection (e.g., NFC, Bluetooth, and/or the like). As another example, the control unit 610 may be configured to control the mobile terminal 600 so as to scan an image and/or barcode, and to extract provisioning data and/or security information from the scanned image and/or barcode.

Figure 7:
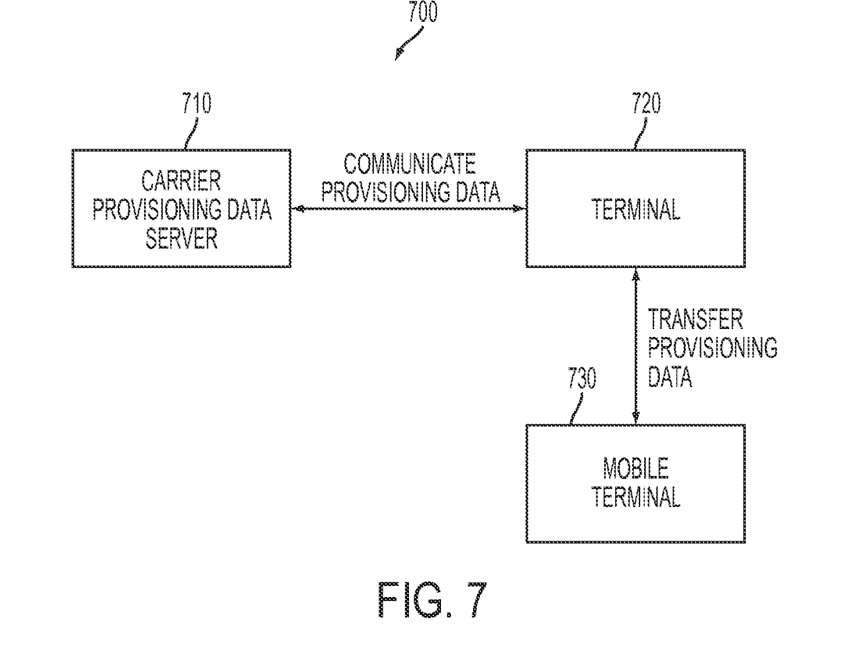
FIG. 7 illustrates a system for activating a mobile terminal according to an embodiment of the present disclosure.

FIG. 7 illustrates a system for activating a mobile terminal according to an embodiment of the present disclosure.

Referring to FIG. 7, a system 700 for activating a mobile terminal to communicate over a desired communication network (e.g., a carrier's communication network) includes a carrier provisioning data server 710, a terminal 720, and a mobile terminal 730.

According to various embodiments of the present disclosure, the carrier provisioning data server 710 is configured to store provisioning data with which a mobile terminal may use to configure the mobile terminal communication settings so as to enable the mobile terminal to communicate with the carrier's communication network.

The terminal 720 is configured to communicate with the carrier provisioning data server 710 to retrieve the provisioning data for the mobile terminal 730. For example, the terminal 720 may be a terminal at the point of sale (e.g., at a retailer at which the mobile terminal 730 was purchased). As another example, the terminal 720 may be a computer connected to the internet which communicates with the carrier provisioning data server 710 using web services or a client application provided and secured by the carrier.

According to various embodiments of the present disclosure, the user/owner of the mobile terminal 730 may be provided with a secure website from which the user/owner may receive the provisioning data. For example, the user/owner of the mobile terminal 730 may be provided the address to the secure website on a receipt relating to the purchase of the mobile terminal 730, may receive the secure website via email after registration of the mobile terminal 730, and/or the like. According to various embodiments of the present disclosure, the user/owner of the mobile terminal 730 may access the secure website from a terminal 720 (e.g., from the user's computer, laptop, or the like), and the user/owner of the mobile terminal 730 may receive the provisioning data from the secure website. For example, the user/owner of the mobile terminal 730 may download the provisioning data to the terminal 720 and thereafter transfer the provisioning data and/or secure information to the mobile terminal 730 over a wired connection and/or a wireless connection. As another example, the user/owner of the mobile terminal 730 may access the secure website from the terminal 720 and the secure website may provide an image and/or a barcode in which the provisioning data is embedded or otherwise included. The image and/or the barcode may be displayed on a display unit operatively connected to the terminal 720 or may be printed onto a tangible recording medium. Accordingly, the mobile terminal 730 may scan the image and/or the barcode displayed on the display unit or printed onto the tangible recording medium.

Various embodiments of the present disclosure improve the activation process for activating a mobile terminal (e.g., that has been newly purchased). For example, various embodiments of the present disclosure decrease the time required to complete the activation process. Tables 1 and 2 illustrate the differences in time to complete the activation process between activation processes according to the related art, and activation processes according to various embodiments of the disclosure.

Table 1 illustrates activation times of high-end devices (e.g., mobile terminals).

TABLE 1

| Activation Method | HFA-DC (Device Configuration) | HFA-PRL (Preferred Roaming List) | Total Device Activation Time |
|---|---|---|---|
| Activation over 3G | 45 seconds [Range: 45-50 seconds] | 20 seconds [Range: 20-25 seconds] | 60 seconds [Range: 65-75 seconds] |
| Activation over 4G LTE | 30 seconds [Range: 30-55 seconds] | 15 seconds [Range: 15-20 seconds] | 45 seconds [Range: 45-55 seconds] |
| Activation over WiFi | 20 seconds [Range: 20-25 seconds] | 15 seconds [Range: 15-20 seconds] | 35 seconds [Range: 35-45 seconds] |
| Activation according to various embodiments of the present disclosure (e.g., scanning a QR code) | Less than 15 seconds (including scanning, decoding, processing, and activation) | | Less than 15 seconds |

Table 2 illustrates activation times of low-end devices (e.g., mobile terminals).

TABLE 2

| Activation Method | HFA-DC (Device Configuration) | HFA-PRL (Preferred Roaming List) | Total Device Activation Time |
|---|---|---|---|
| Activation over 3G | 50 seconds [Range: 50-60 seconds] | 20 seconds [Range: 20-25 seconds] | 70 seconds [Range: 75-85 seconds] |
| Activation over 4G LTE | N/A | N/A | N/A |
| Activation over WiFi | 25 seconds [Range: 25-30 seconds] | 15 seconds [Range: 15-20 seconds] | 40 seconds [Range: 40-50 seconds] |
| Activation according to various embodiments of the present disclosure (e.g., scanning a QR code) | Less than 15 seconds (including scanning, decoding, processing, and activation) | | Less than 15 seconds |

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for activating a mobile terminal to communicate over a communication network, the method comprising:
    retrieving, by a terminal via a secure website, at least one of an image and a barcode including provisioning data associated with the communication network, the provisioning data included in the at least one of the image and the barcode comprising a preferred roaming list;
    authenticating, by the terminal, that the mobile terminal is an authorized recipient of the provisioning data;
    displaying, by the terminal via the secure website, the at least one of the image and the barcode including the provisioning data comprising the preferred roaming list, the at least one of the image and the barcode embedded into at least one of a plane ticket and a travel reservation;
    scanning, by the mobile terminal, the at least one of the image and the barcode embedded into the at least one of a plane ticket and a travel reservation;
    determining, by the mobile terminal, whether the provisioning data received from the terminal has expired; and
    configuring, if the provisioning data received from the terminal has not expired, communication settings of the mobile terminal using the provisioning data,
    wherein the preferred roaming list included in the at least one of the image and the barcode is specific to a destination location of the at least one of the plane ticket and the travel reservation.

2. The method of claim 1, wherein the retrieving of the provisioning data by the terminal comprises:
    communicating with a provisioning data server using at least one of web services and a client application.

3. The method of claim 1, wherein the at least one of the image and the barcode comprises security information which provides security for the provisioning data.

4. The method of claim 3, wherein the security information is included in the provisioning data.

5. The method of claim 1, further comprising generating of the at least one of the image and the barcode,
    wherein the generating of the at least one of the image and the barcode comprises generating, by the provisioning data server, the at least one of the image and the barcode.

6. The method of claim 1, wherein the scanning of the at least one image and the barcode comprises:
    scanning the at least one of the image and the barcode which is displayed on a display operatively connected to the terminal.

7. The method of claim 1, further comprising:
    reproducing the at least one of the image and the barcode on a tangible recording medium; and
    performing image capture of the at least one the image and the barcode.

8. The method of claim 1, further comprising:
    verifying that the provisioning data is applicable to the mobile terminal.

9. The method of claim 8, wherein the determining whether the provisioning data received from the terminal has expired comprises:
    determining whether the provisioning data has expired using an expiration date included with the provisioning data.

10. The method of claim 1, wherein the provisioning data is transferred from the terminal to the mobile via Near Field Communications (NFC).

11. The method of claim 1, wherein the provisioning data includes information for configuring the mobile terminal after initial activation of the mobile terminal.

12. The method of claim 11, wherein the provisioning data includes information for at least one of a firmware upgrade, and a software upgrade.

13. A mobile terminal for using provisioning data to activate communication across a communication network, the mobile terminal comprising:

a transceiver configured to communicate with at least one of a terminal and a communication network;
a camera configured to scan the at least one of an image and a barcode, the provisioning data being included in the at least one of the image and the barcode comprising a preferred roaming list; and
at least one processor configured to:
provide authentication that the mobile terminal is an authorized recipient of the provisioning data,
determine whether the provisioning data received from the terminal has expired, and
configure, if the provisioning data received from the terminal has not expired, the transceiver to communicate across the communication network using the provisioning data,
wherein the mobile terminal scans the at least one of the image and the barcode including the provisioning data comprising the preferred roaming list which is displayed via a secure website on a display operatively connected to the terminal, the at least one of the image and the barcode being embedded into at least one of a plane ticket and a travel reservation, and
wherein the preferred roaming list included in the at least one of the image and the barcode is specific to a destination location of the at least one of the plane ticket and the travel reservation.

14. The mobile terminal of claim 13, wherein the at least one of the image and the barcode comprises security information which provide security for the provisioning data.

15. The mobile terminal of claim 14, wherein the security information is included in the provisioning data.

16. The mobile terminal of claim 13, wherein the mobile terminal scans the at least one of the image and the barcode which is displayed on a display operatively connected to the terminal.

17. The mobile terminal of claim 13, wherein the mobile terminal scans the at least one of the image and the barcode from a tangible recording medium on which the terminal has recorded the provisioning data.

18. The mobile terminal of claim 13, wherein the at least one processor is further configured to verify that the provisioning data is applicable to the mobile terminal.

19. The mobile terminal of claim 18, wherein the at least one processor is further configured to determine whether the provisioning data has expired using an expiration date included with the provisioning data.

20. The mobile terminal of claim 13, wherein the provisioning data includes information for configuring the mobile terminal after initial activation of the mobile terminal.

21. The mobile terminal of claim 20, wherein the provisioning data includes information for at least one of a firmware upgrade, and a software upgrade.

22. A system for activating a mobile terminal to communicate over a communication network, the system comprising:
a provisioning data server configured to:
store provisioning data associated with the communication network,
generate at least one of an image and a barcode including the provisioning data associated with the communication network, the provisioning data included in the generated at least one of the image and the barcode comprising a preferred roaming list, and
communicate with a terminal via a secure website;
the terminal configured to:
authenticate that the mobile terminal is an authorized recipient of the provisioning data,
retrieve, via the secure website, the at least one of the image and the barcode including the provisioning data from the provisioning data server, and
display, via the secure website, the at least one of the image and the barcode to the mobile terminal, the provisioning data comprising the preferred roaming list being included in the at least one of the image and the barcode; and
the mobile terminal configured to:
receive the provisioning data comprising the preferred roaming list from the terminal by scanning the at least one of the image and the barcode embedded into at least one of a plane ticket and a travel reservation,
determine whether the provisioning data received from the terminal has expired, and
configure, if the provisioning data comprising the preferred roaming list received from the terminal has not expired, communication settings of the mobile terminal using the provisioning data,
wherein the preferred roaming list included in the at least one of the image and the barcode is specific to a destination location of the at least one of the plane ticket and the travel reservation.

* * * * *